(12) United States Patent
Kim et al.

(10) Patent No.: US 9,009,248 B2
(45) Date of Patent: Apr. 14, 2015

(54) APPARATUS AND METHOD OF PERFORMING DISCOVERY BASED ON PRIORITY LEVEL IN DISTRIBUTED NETWORK, AND METHOD OF DETERMINING DISCOVERY BACK-OFF TIME

(75) Inventors: Jae-Hyuk Kim, Gunpo-si (KR); Soo-Hyung Lee, Daejeon-si (KR); Hyung-Kook Jun, Seoul (KR); Kyung-Il Kim, Daejeon-si (KR); Kyeong-Tae Kim, Chuncheon-si (KR); Yong-Yeon Kim, Daejeon-si (KR); Won-Tae Kim, Asan-si (KR); Seung-Min Park, Daejeon-si (KR); In-Whee Joe, Seoul (KR); Je-Man Park, Suncheon-si (KR); Woo-Yeob Lee, Incheon-si (KR); Sung-Moon Chung, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 452 days.

(21) Appl. No.: 13/523,042

(22) Filed: Jun. 14, 2012

(65) Prior Publication Data
US 2012/0324033 A1 Dec. 20, 2012

(30) Foreign Application Priority Data

Jun. 15, 2011 (KR) .................. 10-2011-0058106

(51) Int. Cl.
*G06F 15/16* (2006.01)
*G06F 15/173* (2006.01)
*H04L 29/08* (2006.01)

(52) U.S. Cl.
CPC ............. *H04L 67/10* (2013.01); *H04L 67/16* (2013.01)

(58) Field of Classification Search
CPC ......... G06F 9/465; H04L 45/26; H04L 67/10; H04L 67/16; H04L 45/00
USPC .......................... 709/207, 223, 224, 200, 227
See application file for complete search history.

(56) References Cited

U.S. PATENT DOCUMENTS

| | | | |
|---|---|---|---|
| 6,215,792 B1 * | 4/2001 | Abi-Nassif | 370/458 |
| 7,466,665 B2 * | 12/2008 | Calcev et al. | 370/255 |
| 7,515,544 B2 * | 4/2009 | Nambisan et al. | 370/238 |

(Continued)

FOREIGN PATENT DOCUMENTS

| KR | 10-2011-0029190 | 3/2011 |
|---|---|---|
| KR | 10-1024901 | 3/2011 |

OTHER PUBLICATIONS

Joe Hoffert et al., A Taxonomy of Discovery Services and Gap Analysis for Ultra-Large Scale Systems, 2007. pp. 355-361.

(Continued)

*Primary Examiner* — Philip Chea
*Assistant Examiner* — Mohammed Ahmed
(74) *Attorney, Agent, or Firm* — Staas & Halsey LLP (57) ABSTRACT

Provided are a network node and a method of performing discovery, which may stably perform discovery without delay or crash of a network at the time of initial discovery in a large-scale network. The network node operated in a distributed network includes a discovery performing unit that determines a discovery back-off time that is a transmission wait time of a discovery message based on levels of priority of the network node, and a communication unit that transmits the discovery message using the discovery back-off time.

14 Claims, 5 Drawing Sheets

(56) References Cited

U.S. PATENT DOCUMENTS

| | | | |
|---|---|---|---|
| 7,665,096 B2 | 2/2010 | Weida | |
| 2004/0077367 A1* | 4/2004 | Sama et al. | 455/518 |
| 2004/0146019 A1* | 7/2004 | Kim et al. | 370/329 |
| 2004/0205373 A1* | 10/2004 | Shoaib et al. | 714/1 |
| 2005/0058151 A1* | 3/2005 | Yeh | 370/445 |
| 2005/0154794 A1* | 7/2005 | Deshpande | 709/227 |
| 2005/0185588 A1* | 8/2005 | Park et al. | 370/238 |
| 2005/0271076 A1* | 12/2005 | Ganti et al. | 370/448 |
| 2007/0110092 A1* | 5/2007 | Kangude et al. | 370/448 |
| 2007/0118842 A1* | 5/2007 | Weida | 719/330 |
| 2007/0177574 A1* | 8/2007 | Park et al. | 370/350 |
| 2007/0214256 A1* | 9/2007 | Castaneda et al. | 709/224 |
| 2007/0253352 A1* | 11/2007 | Arisha et al. | 370/328 |
| 2008/0101361 A1* | 5/2008 | Brown | 370/390 |
| 2008/0159162 A1* | 7/2008 | Morikuni et al. | 370/252 |
| 2009/0213815 A1* | 8/2009 | Sherman et al. | 370/336 |
| 2009/0219915 A1* | 9/2009 | Orcutt et al. | 370/347 |
| 2009/0222573 A1* | 9/2009 | Grossner et al. | 709/235 |
| 2009/0271466 A1* | 10/2009 | Fields et al. | 709/201 |
| 2010/0027532 A1* | 2/2010 | Sparks et al. | 370/352 |
| 2011/0069686 A1* | 3/2011 | Raman | 370/338 |
| 2011/0161455 A1* | 6/2011 | Johnson et al. | 709/209 |
| 2011/0170573 A1* | 7/2011 | Kim et al. | 375/130 |
| 2011/0295923 A1* | 12/2011 | De Campos Ruiz et al. | 709/201 |
| 2012/0246295 A1* | 9/2012 | Gonzalez-Banos et al. | 709/224 |
| 2013/0183906 A1* | 7/2013 | Tavildar et al. | 455/67.11 |
| 2013/0301547 A1* | 11/2013 | Gupta et al. | 370/329 |
| 2014/0153408 A1* | 6/2014 | Jun et al. | 370/250 |

OTHER PUBLICATIONS

Jeman Park et al., A Fast and Scalable Service Discovery Protocol for CPS-Based Warships, 2011, pp. 335-338.

Nanbor Wang et al., Toward an Adaptive Data Distribution Service for Dynamic Large-Scale Network-centric Operation and Warfare (NCOW) Systems to be submitted to the 2008 Military Communications Conference, 2008.

* cited by examiner

100 and the network node #2 300 may have priority
APPARATUS AND METHOD OF PERFORMING DISCOVERY BASED ON PRIORITY LEVEL IN DISTRIBUTED NETWORK, AND METHOD OF DETERMINING DISCOVERY BACK-OFF TIME

CROSS-REFERENCE TO RELATED APPLICATION

This application claims the benefit under 35 U.S.C. §119(a) of Korean Patent Application No. 10-2011-0058106, filed on Jun. 15, 2011, the entire disclosure of which is incorporated herein by reference for all purposes.

BACKGROUND

1. Field

The following description relates to a discovery technique of a network node in a large-scale distributed network, and more particularly, to an apparatus and method that determine a random back-off time of a plurality of network nodes in a large-scale distributed network.

2. Description of the Related Art

As a ubiquitous society that is a communication environment capable of always being connected to a network regardless of time and place has been realized, a large-scale distributed network which is required to provide services for a large-scale object in a variety of fields has increased. In the large-scale distributed network, directory-based discovery methods have fatal defects such as single point of failure. To overcome these defects, in recent years, a directory-less discovery method has been proposed in a discovery protocol of real-time publish-subscribe (RTPS).

A directory-less discovery does not separately provide a server for managing a network, and therefore, a whole network is prevented from going down due to damage or destruction of the server. For this, each node participating in communication transmits a discovery message for discovery. In this instance, in a case of the large-scale network, a large number of nodes simultaneously transmit the discovery messages, and therefore, a discovery speed of the whole network may become significantly slow, or the network may go down.

In the large-scale distributed network, the nodes simultaneously transmit the messages for discovery on the network, and a large amount of traffic is generated in the network at a time to cause collision, and therefore, communication in a corresponding network may be greatly delayed, or the network may go down.

In other words, when the large number of nodes simultaneously transmit the messages for discovery to find each other, traffic close to or exceeding a maximum transmission rate of the network is momentarily generated, so that communication over the whole network may not be performed smoothly or may even be cut off.

In addition, discovery is randomly performed at the time of initial discovery, and therefore, a desired discovery object may not be easily found, depending on a situation.

SUMMARY

The following description relates to a network node and a method of performing discovery, which may stably perform discovery without delay or crash of a network at the time of initial discovery in a large-scale network.

In one general aspect, there is provided a discovery method of a network node in a distributed network, including: determining a discovery back-off time that is a transmission wait time of a discovery message based on levels of priority of the network node; and transmitting the discovery message using the discovery back-off time.

In another aspect, there is provided a network node which is operated in a distributed network, including: a discovery performing unit that determines a discovery back-off time that is a transmission wait time of a discovery message based on levels of priority of the network node; and a communication unit that transmits the discovery message using the discovery back-off time.

In still another aspect, there is provided a method of determining a discovery back-off time of a network node in a distributed network, the method including: calculating a range of the back-off time using levels of priority of the network node; and randomly determining the discovery back-off time within the range of the back-off time.

Other features and aspects will be apparent from the following detailed description, the drawings, and the claims.

BRIEF DESCRIPTION OF THE DRAWINGS

Throughout the drawings and the detailed description, unless otherwise described, the same reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 1:
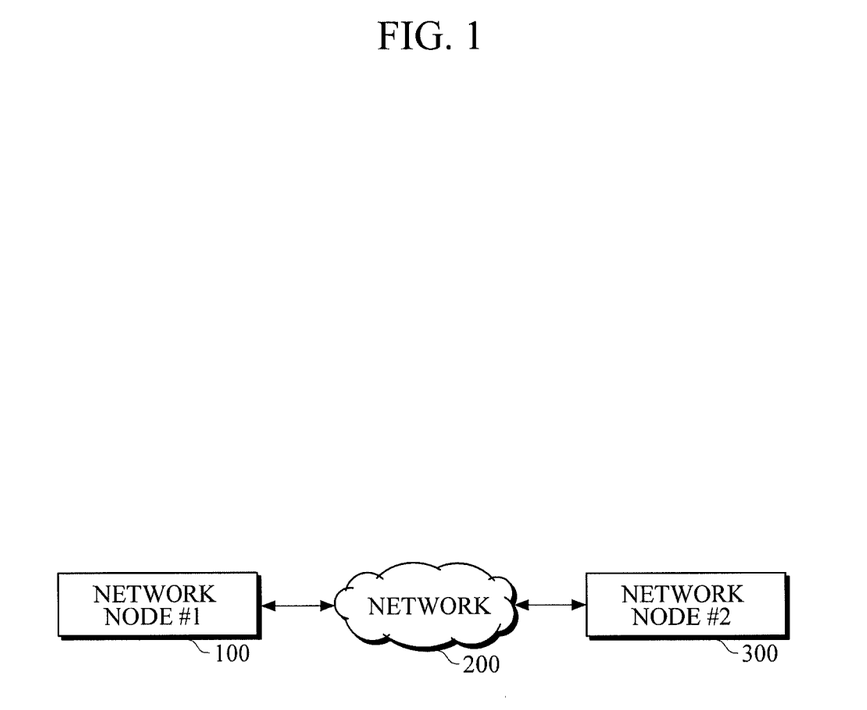
FIG. 1 is a diagram showing a configuration of a distributed network according to an embodiment of the present invention.

FIG. 1 is a diagram showing a configuration of a distributed network according to an embodiment of the present invention.

In the distributed network, a network node #1 100 and a network node #2 300 are connected through a network 200. The network 200 may be a wired communication network, wireless communication network, or a combination thereof.

A variety of distributed networks may be provided such as an ad-hoc network, a directory-less network, and a cyber physical system (CPS) network. In FIG. 1, for convenience is of description, two network nodes are shown; however, there is no particular limitation on the number of the network nodes. A plurality of network nodes including the network node #1 100 and the network node #2 300 may have priority which is different in levels. The network nodes may be a variety of terminal devices such as mobile phones, smart phones, laptop computers, stationary computers, set-top boxes, and the like.

Each of the network node #1 100 and the network node #2 300 may use a data distribution service (DDS) middleware. The DDS middleware is a middleware that provides data exchange between devices, and is a DDS middleware technique which is internationally standardized in the object management group (OMG).

The DDS middleware is composed of a publisher that provides data and a subscriber that is provided with data, and is a peer-to-peer structure without a server, in which only participants having the same topic perform communication with respect to participants of all networks.

The DDS middleware may perform real-time data distribution based on publisher/subscriber, and provide a differential QoS for a distribution node.

The DDS middleware may be briefly classified into a data-centric publish-subscribe (DCPS) layer and a layer using a real-time publish subscribe (RTPS) protocol. The DCPS layer is a middleware interface having specification of publish/subscribe for a distribution environment, and provides a standardized interface with respect to a publish/subscribe programming model focused on data for the distribution environment.

The layer using the RTPS protocol is a layer in which actual data is published and subscribed, and provides functions of determining domain formation and a type of data to be used and dynamically discovering remote participants in a domain. In addition, actual data is published or subscribed by the publisher or the subscriber of the DCPS layer, and reliable or unreliable data communication is performed in accordance with the QoS set in the DCPS layer.

The network node #1 100 and the network node #2 300 are operated as participants which are RTPS communication objects. For convenience, the following description will focus on the network node #1 100. The network node #1 100 may transmit a discovery message in a unicast or multicast scheme so as to discover other nodes such as the network node #2 300. Such a process is referred to as a participant discovery process.

The discovery message may include information about a protocol version, a vendor identifier, unicast and multicast locators (a transmission address, a port number, etc.), a method of tracing a participant, and the like. Each of the network nodes transmits and exchanges the discovery message via the network to thereby discover participants belonging to the same DDS domain. When the participant discovery process is completed, the network nodes perform an endpoint discovery process which discerns and exchanges QoS information of a datawriter or a datareader that is a communication object actually performing topic data transmission from among the participants.

In each of the network nodes such as the network node #1 100, default back-off time is set. The default back-off time is a random back-off time which is generated and provided between a default minimum back-off and a default maximum back-off time.

The application layer of the network node #1 100 provides priority suitable for the application environment of a corresponding node in accordance with the application environment. The priority may be represented as numerical values or levels, however, the present invention is not limited thereto. Hereinafter, it is assumed that each priority of the network nodes is represented as a level of priority. The levels of the priority may be determined using at least one of a plurality of QoS types generated in the DCPS layer. A variety of kinds of QoS types such as deadline, reliability, user data, topic data, lifespan, and the like may be present. In the DDS, dynamic generation of an unspecified number of subscribers is made possible, and priority may be determined using the QoS applied when publishers and subscribers are dynamically generated. Accordingly, the priority of the network node #1 100 may also be dynamically determined.

According to an embodiment of the present invention, the network node #1 100 reflects the priority level in a transmission wait time of a discovery message during the participant discovery process, during the participant discovery process according to bootstrap, and during transmitting the discovery message, and determines the reflected priority. Hereinafter, the transmission wait time of the discovery message is referred to as a discovery back-off time.

In a case in which a participant discovery operation of the network node #1 100 is performed, the network node #1 100 may wait a default back-off time, and then exchange the discovery messages when the priority provided from the application layer of the network node #1 100 is absent or is not found.

When the priority provided from the application layer of the network node #1 100 is present, the discovery back-off time of the network node #1 100 may be determined based on the determined levels of the priority. Accordingly, the network node #1 100 may wait the discovery back-off time depending on the levels of the priority of the network node #1 100 before transmitting the discovery message, and then transmit the discovery message.

As for the discovery back-off time considering the levels of the priority, as the priority increases incrementally between a default minimum back-off time and a default maximum back-off time, a back-off time may be generated and provided within a narrow range of durations or randomly. The above description has focused on operation of the network node #1 100, however each of the network nodes operated as participants in the distributed network may determine the discovery back-off time based on the priority in the same manner as the network node #1 100, wait the determined discovery back-off time, and then transmit the discovery message. In this case, the network nodes having high priority may preferentially transmit the discovery message, so that a user of a terminal device such as the network node #1 100 in the distributed network may discover the network nodes having high priority more quickly than the network nodes having low priority.

Hereinafter, a process of determining the discovery back-off time will be described.

A function for determining the discovery back-off time is referred to as a back-off function B (priority$_{application}$). When the priority provided from the application layer is priority$_{application}$, the back-off time is set shorter as the priority is higher, and therefore, the back-off function B (priority$_{application}$) may be calculated as inversely proportional to priority$_{application}$.

The discovery back-off time may be randomly determined within a range of the back-off time. Here, an increment of the back-off time according to the number of levels of the priority assigned to the network may be calculated, and then the range of the back-off time may be calculated using the increment of the back-off time and the levels of the priority of the network node. The increment of the back-off time according to the number of levels of the priority assigned to the network may be calculated by dividing a difference between a maximum back-off time and a minimum back-off time by the number of levels of the priority. This is represented as the following Equation 1.

$$RBT_{unit} = \frac{BT_{max} - BT_{min}}{N_{priority}} \quad \text{[Equation 1]}$$

Here, $RBT_{unit}$ denotes an increment of the back-off time, $BT_{max}$ denotes a maximum back-off time, $BT_{min}$ denotes a minimum back-off time, and $N_{priority}$ denotes the number of a total of levels of priority provided from the application layer.

The range $RBT_N$ of the back-off time assigned to a node N may be calculated as the following Equation 2.

$$RBT_N = \left[ \frac{BT_{max} - BT_{min}}{N_{priority}} * P_{v-1}, \frac{BT_{max} - BT_{min}}{N_{priority}} * P_v \right]$$

Here, $P_v$ denotes levels of priority provided from the application layer by the node N. It is assumed that the levels of the priority are assigned as numerical values which are increased one by one as the priority decreases. $P_{v-1}$ denotes a level that is one higher than $P_v$. In this case, for example, when $P_v$ is a second level, $P_{v-1}$ may be a first level.

In this manner, when the discovery back-off time is determined by the back-off function, a plurality of nodes may effectively distribute a time of transmitting the discovery message in a large-scale network, and the nodes may quickly perform discovery in the network in order of descending priority.

Figure 2:
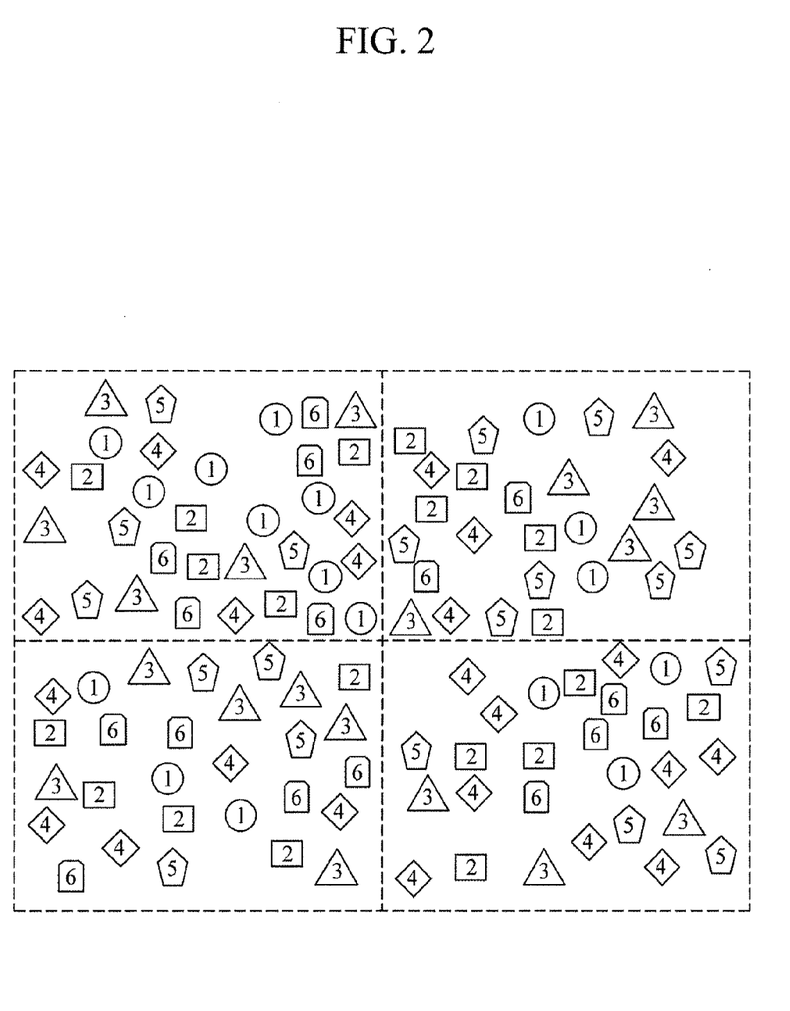
FIG. 2 is a diagram showing a configuration of a distributed network in which priority is according to an embodiment of the present invention is reflected.

FIG. 2 is a diagram showing a configuration of a large-scale distributed network in which a priority level according to an embodiment of the present invention is reflected.

As shown in FIG. 2, in the large-scale distribution network in which the priority is provided from an application layer, a total of six levels of priority are assigned. Figures shown in FIG. 2 indicate network nodes, and numerical numbers in the figures indicate levels of priority of a corresponding network node.

In FIG. 2, a first level indicates a level of the highest priority, and a sixth level indicates a level having the lowest priority.

It is assumed that a default minimum back-off time is 0 sec, a default maximum back-off time is 60 sec, and a default random back-off time is 30 sec. As the priority increases, a range within which a discovery back-off time is determined may decrease.

The back-off time may be calculated in 10 sec increments using Equation 1.

A range $RBT_N$ of the back-off time for each priority may be calculated as a range of [0,10] sec when the range is a first level, [10,20] sec when the range is a second level, [20,30] sec when the range is a third level, [30,40] sec when the range is a fourth level, [40,50] sec when the range is a fifth level, and [50,60] sec when the range is a sixth level.

Accordingly, the network node to which the first level is assigned from an application layer may generate a discovery back-off time between 0 to 10 seconds, wait the discovery back-off time of 0 to 10 seconds, and then transmit a discovery message.

Figure 3:
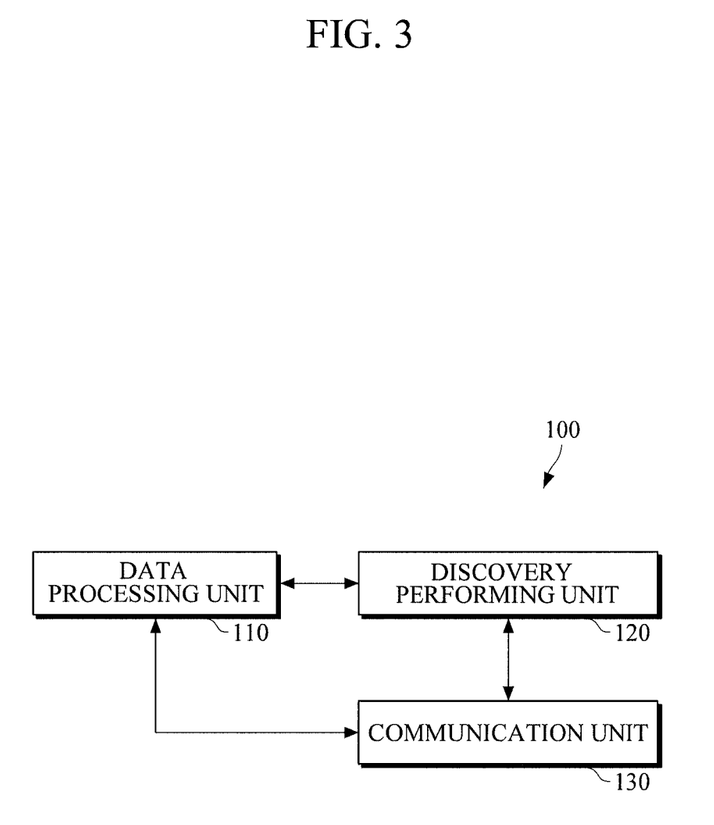
FIG. 3 is a block diagram showing a configuration of a network node performing discovery based on priority according to an embodiment of the present invention.

FIG. 3 is a block diagram showing a configuration of a network node performing discovery based on priority according to an embodiment of the present invention.

A network node #1 100 may include a data processing unit 110, a discovery performing unit 120, and a communication unit 130.

The data processing unit 110 may process applications relating to operations of the network node #1 100, and provide a data distribution service (DDS). In addition, the data processing unit 110 may be configured such that functions of a DCPS layer such as publication and reception of topic data, generation of QoS, and the like are performed.

The discovery performing unit 120 may be configured such that a participant discovery process and an endpoint discovery process are performed. In particular, the discovery performing unit 120 may generate a discovery message, and determine a discovery back-off time based on priority provided from an application layer so as to perform discovery based on the priority.

For this, the discovery performing unit 120 may request and acquire levels of the priority of the network node from the application layer executed in the data processing unit 110. The discovery performing unit 120 may determine the discovery back-off time that is a transmission wait time of the discovery message based on the levels of the priority of the network node #1 100. The discovery performing unit 120 may calculate an increment of the back-off time in accordance with the number of levels of the priority assigned to the network, calculate a range of the back-off time using the increment of the back-off time and the levels of the priority of the network node, and randomly determine the discovery back-off time within a range of the back-off time.

The discovery performing unit 120 may calculate the increment of the back-off time by dividing a difference between a maximum back-off time and a minimum back-off time by the number of levels of the priority level. When the number of levels of the priority is n, the discovery performing unit 120 may determine the range of the back-off time between a lower limit value obtained by multiplying the increment of the back-off time by (n−1) and an upper limit value obtained by multiplying the increment of the back-off time by n.

Meanwhile, when the levels of the priority of the network node are absent, the discovery performing unit 120 may determine a default random back-off time as the discovery back-off time.

The communication unit 130 may transmit the message generated in the data processing unit 110 and the discovery performing unit 120 through a lower Ethernet-based transmission network, and receive a DDS related message through the network. The communication unit 130 may repeatedly transmit the discovery message during the back-off time. The communication unit 130 may receive, from another network node, the discovery message transmitted using a discovery back-off time of the other network node which is determined based on levels of priority of the other network node.

Figure 4:
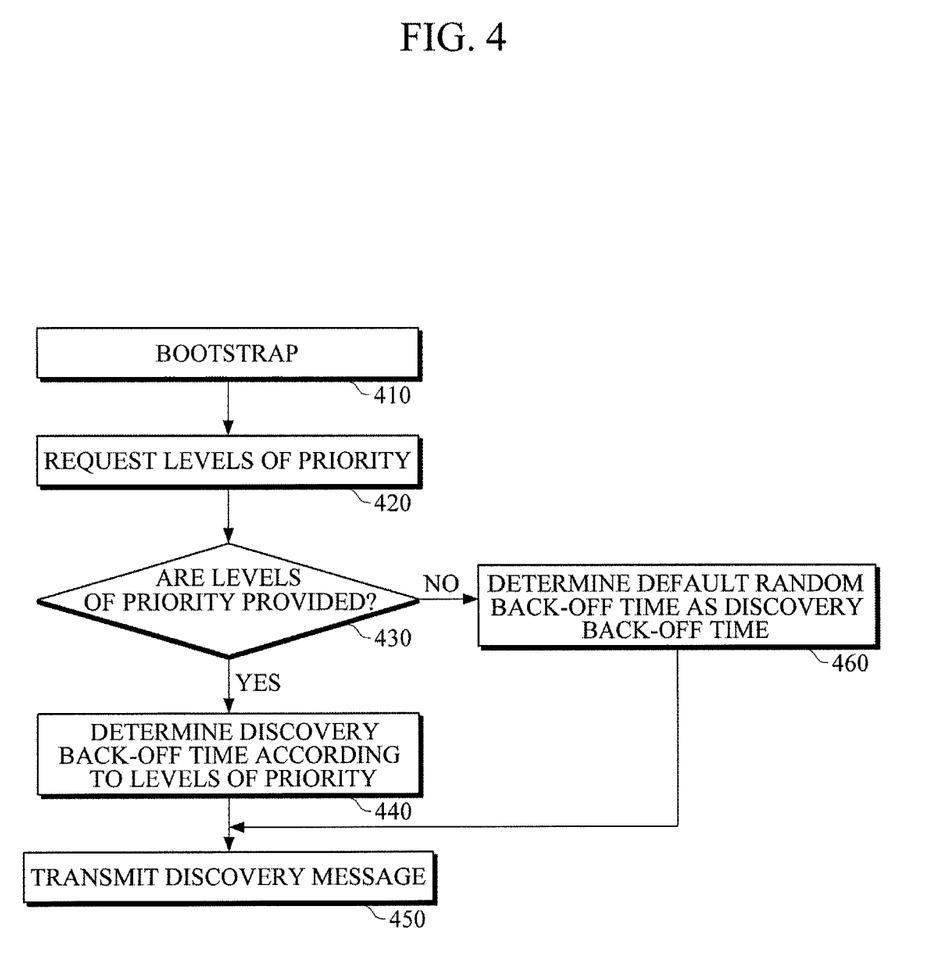
FIG. 4 is a flowchart showing a discovery method based on priority in a distributed network according to an embodiment of the present invention.

FIG. 4 is a flowchart showing a discovery method based on priority in a distributed network according to an embodiment of the present invention.

When a system bootstrap of a network node starts in step 410, the network node requests levels of priority from its own application in step 420.

When the levels of the priority are provided in step 430, the network node determines a discovery back-off time that is a transmission wait time of a discovery message based on the levels of the priority of the network node in step 440.

The network node waits the discovery back-off time, and then transmits the discovery message using the determined discovery back-off time in step 450.

When the levels of the priority are not provided in step 430, the network node determines a default random back-off time set in advance as the discovery back-off time in step 450. Thereafter, the network node transmits the discovery message using the default random back-off time in step 450.

Figure 5:
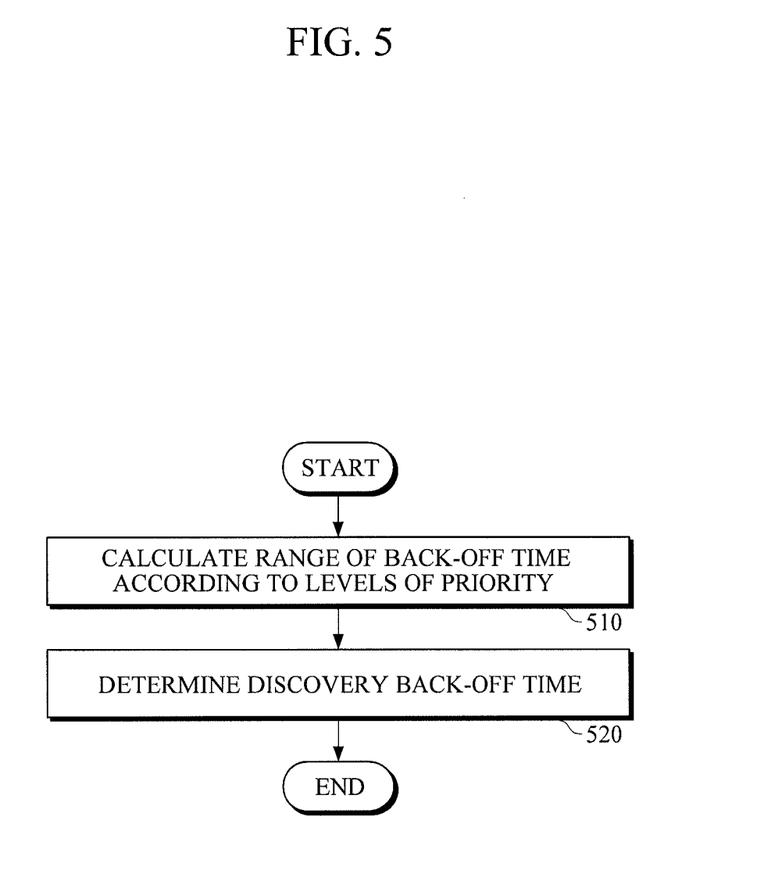
FIG. 5 is a flowchart showing a method of determining a discovery back-off time according to an embodiment of the present invention.

FIG. 5 is a flowchart showing a method of determining a discovery back-off time according to an embodiment of the present invention.

The network node calculates a range of a back-off time based on levels of priority in step 510. When the number of levels of the priority is n, the range of the back-off time may be determined between a lower limit value in which the increment of the back-off time is multiplied by (n−1), and an upper limit value obtained by multiplying the increment of the back-off time by n.

The network node randomly determines the discovery back-off time within the range of the back-off time in step 520.

The present invention can be implemented as computer-readable code in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as Internet transmission. In addition, the computer-readable recording medium may be distributed among computer systems over a network, such that computer-readable codes may be stored and executed in a distributed manner.

As apparent from the above description, in the large-scale network, discovery may be stably performed without delay or crash of the network at the time of initial discovery.

In addition, appropriate network nodes are effectively found according to situation by reflecting the importance or priority of a discovery object, such that necessity of the network node suitable for the environment may be reflected in the network.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A discovery method of a hardware network node in a distributed network, comprising:
   determining a discovery back-off time that is a transmission wait time of a discovery message based on levels of priority of the hardware network node; and transmitting the discovery message using the discovery back-off time;
   wherein the determining of the discovery back-off time further comprises:
   calculating an increment of the back-off time in accordance with the number of levels of the priority assigned to the network,
   calculating a range of the back-off time using the increment of the back-off time and the levels of the priority of the hardware network node, and
   randomly determining the discovery back-off time within the range of the back-off time;
   wherein, in the calculating of the range of the back-off time, the range of the back-off time is determined between a lower limit value obtained by multiplying the increment of the back-off time by (n−1) and an upper limit value obtained by multiplying the increment of the back-off time by n, when the number of levels of the priority is n.

2. The discovery method according to claim 1, wherein, in the calculating of the increment of the back-off time, the increment of the back-off time is calculated by dividing a difference between a maximum back-off time and a minimum back-off time by the number of levels of the priority.

3. The discovery method according to claim 1, wherein a default random back-off time set in advance is determined as the discovery back-off time when the levels of the priority of the network node are absent.

4. The discovery method according to claim 1, further comprising: requesting the levels of the priority of the network node from an application layer.

5. The discovery method according to claim 1, wherein, in the transmitting of the discovery message, the discovery message is transmitted repeatedly during the discovery back-off time.

6. The discovery method according to claim 1, further comprising: receiving, from another network node, a discovery message transmitted using a discovery back-off time of the other network node determined based on levels of priority of the other network node to thereby discover the other network node.

7. The discovery method according to claim 1, wherein the determining of the discovery back-off time is performed during a participant discovery process accompanying start of a bootstrap of the network node.

8. The discovery method according to claim 1, wherein the levels of the priority are determined using at least one of a plurality of QoS types generated in a DCPS layer.

9. A hardware network node which operates in a distributed network, comprising: a discovery performing unit that determines a discovery back-off time that is a transmission wait time of a discovery message based on levels of priority of the network node; and a communication unit that transmits the discovery message using the discovery back-off time;
   wherein the discovery performing unit
   calculates an increment of the back-off time in accordance with the number of levels of the priority assigned to the network,
   calculates a range of the back-off time using the increment of the back-off time and the levels of the priority of the hardware network node, and
   randomly determines the discovery back-off time within the range of the back-off time:
   wherein the discovery performing unit determines the range of the back-off time between a lower limit value obtained by multiplying the increment of the back-off time by (n−1) and an upper limit value obtained by multiplying the increment of the back-off time by n, when the number of levels of the priority is n.

10. The network node according to claim 9, wherein the discovery performing unit calculates the increment of the back-off time by dividing a difference between a maximum back-off time and a minimum back-off time by the number of levels of the priority.

11. The network node according to claim 9, wherein the discovery performing unit determines a default random back-off time set in advance as the discovery back-off time, when the levels of the priority of the network node are absent.

12. The network node according to claim 9, wherein the communication unit repeatedly transmits the discovery message during the discovery back-off time.

13. The network node according to claim 9, wherein the communication unit receives, from another network node, a discovery message transmitted using a discovery back-off time of the other network node determined based on levels of priority of the other network node.

14. A method of determining a discovery back-off time of a hardware network node in a distributed network, the method comprising:

calculating a range of the back-off time using levels of priority of the network node; and randomly determining the discovery back-off time within the range of the back-off time;

wherein the calculating of the range of the back-off time further includes calculating an increment of the back-off time in accordance with the number of levels of the priority assigned to the network, and the range of the back-off time is calculated using the increment of the back-off time and the levels of the priority of the hardware network node.

wherein, in the calculating of the range of the back-off time, the range of the back-off time is determined between a lower limit value obtained by multiplying the increment of the back-off time by (n−1) and an upper limit value obtained by multiplying the increment of the back-off time by n, when the number of levels of the priority is n.

\* \* \* \* \*